United States Patent [19]

Trill

[11] 3,944,118

[45] Mar. 16, 1976

[54] THERMOPLASTIC RESIN PELLET RATIO LOADER

[76] Inventor: Sidney W. Trill, 25 Montrose Road, Scarsdale, N.Y. 10583

[22] Filed: May 13, 1974

[21] Appl. No.: 469,510

[52] U.S. Cl. ............ 222/134; 222/205; 222/440; 259/180; 302/59
[51] Int. Cl.² ............... B65D 47/00; B65G 53/36
[58] Field of Search ........... 222/134, 145, 439, 205, 222/440; 302/28, 39, 42, 58, 59, 62; 259/180

[56] References Cited
UNITED STATES PATENTS

| | | | |
|---|---|---|---|
| 832,400 | 10/1906 | Lyons | 222/459 X |
| 900,227 | 10/1908 | Svenson | 222/134 X |
| 1,385,254 | 7/1921 | Luft | 222/459 |
| 1,709,211 | 4/1929 | Graham | 222/134 |
| 1,726,812 | 9/1929 | Eggert | 222/134 |
| 1,814,483 | 7/1931 | Morgan | 222/134 X |
| 2,577,920 | 12/1951 | Russell et al. | 259/180 |
| 2,970,532 | 2/1961 | Skelton | 222/134 X |
| 3,309,146 | 3/1967 | Russell | 302/59 X |
| 3,337,194 | 8/1967 | Zavasnik et al. | 259/180 |
| 3,423,130 | 1/1969 | Milner | 302/59 X |
| 3,616,972 | 11/1971 | Christy | 222/459 X |

Primary Examiner—Evon C. Blunk
Assistant Examiner—Jeffrey V. Nase
Attorney, Agent, or Firm—Eliot S. Gerber

[57] ABSTRACT

A thermoplastic resin processing machine has removably affixed onto its loading hopper a ratio loader which has a source of vacuum and two conduits leading to two different reservoirs of thermoplastic resin pellets. The ratio loader has a container having a movable internal separation wall in a vertical plane which is moved horizontally, for example, by rotation of a screwthreaded shaft having a handle at one of its ends. The ratio loader container has a bottom orifice to the thermoplastic processing machine, which orifice is coverable by a flap which is normally closed by a spring and is held closed by the vacuum.

8 Claims, 4 Drawing Figures

THERMOPLASTIC RESIN PELLET RATIO LOADER

BACKGROUND OF THE INVENTION

The present invention relates to plastic industry machinery and more particularly to a loader for loading the hopper of a thermoplastic resin processing machine. Such processing machines include blow molding machines, injection molding machines, film extrusion machines, pipe extrusion machines and screw extrusion machines.

At the present time extrusion is one of the major methods of producing shaped articles from thermoplastic resin. In a widely used extrusion process thermoplastic resin, in the form of pellets, is delivered to a hopper at the top of a screw extrusion machine. For example, the pellets may be delivered to the extrusion factory in large bags and the bags dumped, by machine or by hand, into the hopper. The hopper has an orifice leading to an elongated chamber in which a screw compresses, and by friction heats, the resin pellets until the thermoplastic material becomes a hot formless mass. The thermoplastic assumes the shape of the opening at the extruder head and is cooled to retain that shape.

It is requently desirable to mix two types of plastic pellets to produce the extruded article. For example, it may be less costly to use some percentage of reclaimed resin pellets and the remainder virgin (unreclaimed) resin pellets. The two "types" of resin pellets may, alternatively, be pellets of two different colors or different thermoplastic compositions. Generally at least half virgin pellets are used and, depending upon the type and grade of thermoplastic and the articles to be produced, anywhere from 50 to 5% of reclaimed pellets may be employed. A similar mixing problem is presented when, for uniformity of color or other reasons, it is desired to mix together thermoplastic pellets from different bags or batches.

One method used to obtain such mixtures is to simply dump the different materials into the extrusion hopper one after another. The materials are put into the hopper in sequence and they may be poorly mixed in the hopper, producing a non-uniform "hit-and-miss" mixture which results in non-uniform products. In another method the two materials are mixed in a batch, either by hand or machine, and the mixed batch transferred to the hopper of the extruder. That mixing process requires careful supervision to assure the correct proportions and is time consuming and costly.

A device has been proposed in U.S. Pat. No. 3,309,146 which is a ratio loader. It automatically transfers, by vacuum, two different thermoplastic pellet materials to a ratio loader device installed over the extruder hopper. The ratio of one type of resin pellet to another may be pre-set by the operator. That ratio loader suffers from certain serious defects, namely: (1) as the ratio of one material to another is determined by the heights of the different piles, one pile will generally (except in a 50-50 ratio) be higher than the other. When the load is unloaded the higher pile will continue to flow out after the lower pile has ceased to flow, resulting in a non-uniform mixture of material into the hopper of the extruder; (2) the method of controlling the amount of material causes a cone or dome shape to form on the top surface of the material and this cone or dome shape remains the same whether the proportion of material is small or large, resulting in inaccuracies in obtaining the desired ratios between the two materials.

SUMMARY OF THE INVENTION

In accordance with the present invention a device is provided to load the hopper of a thermoplastic resin processing machine with thermoplastic resin granules or pellets from two different reservoirs of such granules. The ratio loader device is removably attached to the top of the processing machine hopper. It consists of a container (a material receiving chamber) having four top side walls and four bottom side walls, two of the bottom side walls being inclined inwardly to form a bottom chute terminating in a bottom orifice. The bottom orifice is closed by a flap which pivotly opens, at the proper time, to permit the two types of resin granules to fall into a mixer positioned between the bottom orifice and the process machine hopper. The ratio loader device is connected to a source of vacuum; for example, a motor turbine set (an air pump using an impeller) may be mounted on its top. The device has two conduits (tubes or feed pipes) which lead to respective reservoirs, for example, hoppers or storage bins of thermoplastic resin granules, pellets or other granular or pulverant or free-flowing materials. The interior of the container is divided into two volumes by a vertical movable separation wall, the movement of the wall determining the ratio of one type of resin pellet to the other. The separation wall has affixed to it an internally screw-threaded bushing whose threads mesh with the external screw threads of a rotatable shaft. The shaft is rotatably and horizontally mounted and is rotated by an operator controlled handle. The vertical separation wall carries a peripheral seal sealing it to the interior faces of the side walls.

The operator is informed of the two types of resin granules and the ratio required between them. Assuming the ratio loader device of the present invention is already installed on top of the hopper of an extruder or other processing machine, the operator connects one of the conduits to the bin of one type of resin granule and connects the other conduit to the bin for the other type. He then rotates the handle so that the vertical separation wall is placed in direct proportion to the desired ratio. For example, if the desired ratio is 80:20, the wall is moved 80/100 of the distance from one end wall.

The separation wall may be viewed through a glass window and its position directly aligned with a scale positioned below the window. The operator will then start the vacuum which closes the bottom orifice flap and sucks both types of resin granules into their respective sides of the separation wall. The vacuum is automatically shut off, by a timer, after both types of resin granules have reached a predetermined level. The predetermined level is the level of the conduit orifices in the container, the two orifices being at the same level. The smaller amount of resin will form a pile up to its conduit orifice after which the larger amount of resin will rise to the same level. When the vacuum is shut off the bottom flap will open under the weight of the granules and the granules will tumble over each other, become mixed, and fall into the hopper of the processing machine. When all the granules have fallen out of the machine, a spring closes the bottom flap, the closing of the bottom flap activates a switch and the cycle is automatically recommenced by re-application of the vacuum.

It is an objective of the present invention to provide a ratio loader for thermoplastic processing machines in which the ratio of one material to another may be selected and in which, regardless of the ratio so selected, the levels of the two materials within the ratio loader will be essentially the same on both sides of the vertical separation wall, thereby providing that, upon emptying of the container, the two materials commence and finish flowing essentially together, thereby providing a uniform material composition in the process machine hopper. This mixing is further improved by the addition of a mixing device.

It is a further objective of the present invention to provide a ratio loader in which, because the cross-sectional area of each of the two sections changes according to the ratio selected, there is an improved control of the amount of material in each section and an improvement in repetition accuracy.

It is still a further objective of the present invention to provide a ratio loader in which, regardless of the ratio of materials required, the whole volume of the container is used and permits the maximum amount of material to be loaded per cycle.

It is a feature of the present invention that the ratio loader has means to connect the ratio loader to the hopper of a thermoplastic resin forming machine, a set of connected side walls which form an enclosed container, a bottom orifice in said container, a movable flap having opened and closed positions and removably covering said orifice in its closed position and opening to uncover said orifice in its open position, a substantially vertically oriented separation wall within the container and separating the container into two volumes, a first and a second conduit each having an opening into only one of said volumes and each being connectable to different reservoirs of thermoplastic resin granules, means to apply vacuum to within said two container volumes, movement means to move said separation wall sidewise to select the ratio of resin granules from the two different reservoirs, and control means to start and stop said vacuum means in timed relationship to the opening and closing of said flap.

It is a further feature of the present invention that the movement means is an elongated horizontally directed rotatable shaft rotatably mounted on said container and said separation wall has an affixed member having internal screw threads meshing with the threaded shaft.

It is a still further feature of the ratio loader that the bottom orifice is an elongated slot extending to below each of said volumes and that the ratio loader may include a mixer means positioned beneath the flap and above said machine hopper.

DESCRIPTION OF THE INVENTION

The present invention is of a ratio loader device which is adapted to be secured on the top hopper of a thermoplastic processing machine such as a screw extrusion machine. The ratio loader, except as otherwise indicated, is made of metal, for example, of castings, or fabricated from metal sheet stock or any other suitable material. The device as described below will sit on the factory floor without exterior supports, so that it may be lifted by a crane or other means from one processing machine to another and stored on the factory floor or storage area between its use on the hoppers of the processing machines.

Figure 1:
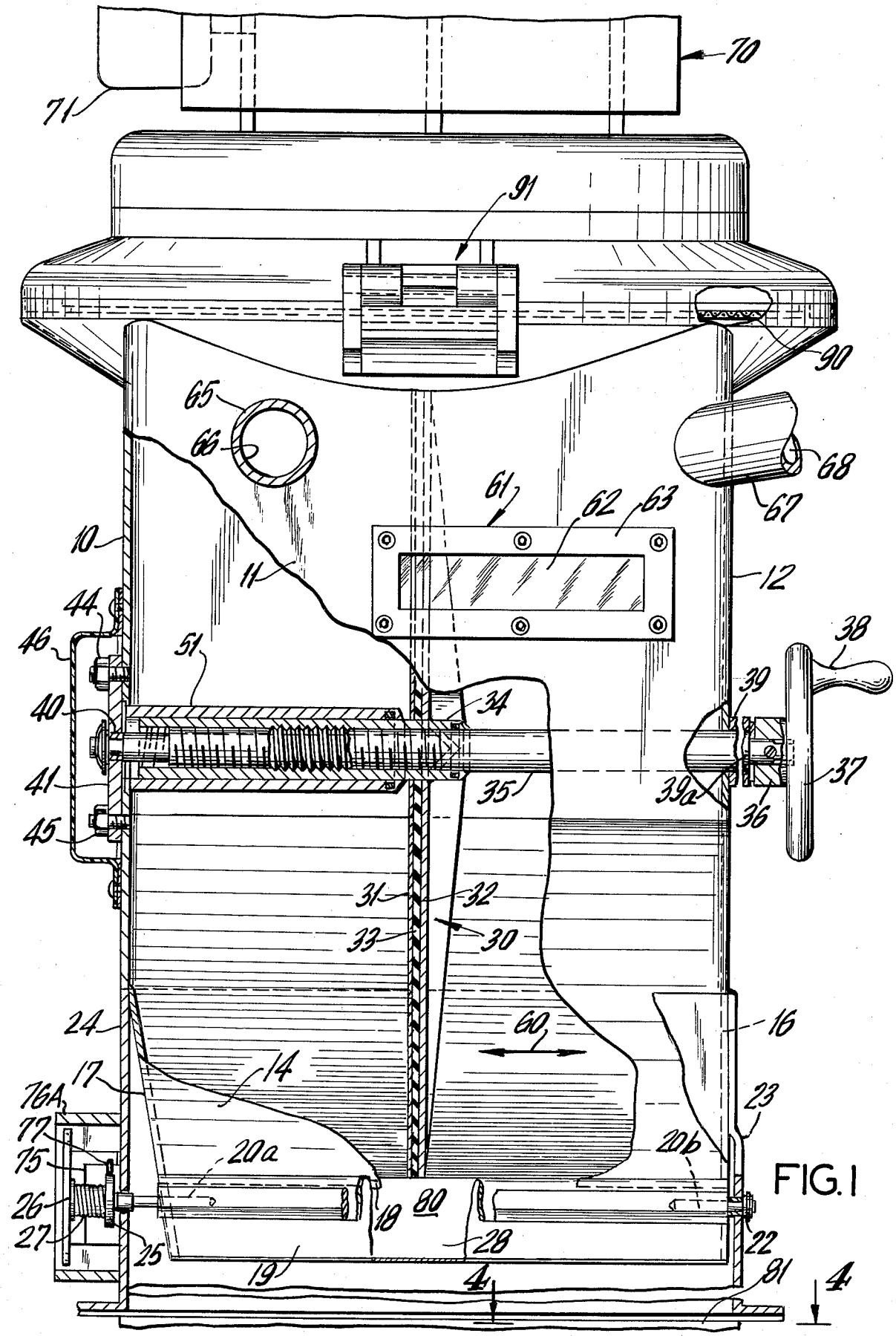
FIG. 1 is a front cross-sectional view of the ratio loader of the present invention.

As shown in FIG. 1, the device includes four top side walls 10, 11, 12 and 13 joined along their sides. The side walls 11 and 13, at their bottom edges, are integral with, or joined with, inwardly slanting bottom side walls 14 and 15 which form a slide slope. The top and bottom side walls form a container. A bottom side wall 16, which is integral with the top side wall 12, is straight. However, the bottom side wall 17, which is joined to the top side wall 10, is preferably, but not necessarily, slightly canted inward. The bottom of the side wall 15 is bent to form an elongated vertical lip 28 and the bottom edge of the bottom side wall 14 has a short vertical lip 18. The lower side walls form a controllable orifice, for example, as shown, a sloped orifice controlled by a hinged flap valve.

A hopper door flap 19 is positioned between the bottoms of the lips 18 and 17. The flap 19 pivots on shafts 20a, 20b and, as shown by the direction of arrow 21, will pivot in a clockwise direction. As shown in FIG. 1, there is a left-hand shaft 20a and a right-hand shaft 20b upon which the flap 19 is fixed. The right-hand shaft 20b is rotatably mounted on the bearing 22 which is fixed to the support bracket 23. The left-hand shaft 20a protrudes through a hole in the left support bracket 24 and carries a fixed washer 25 and is rotatably mounted in the bearing 26. A torsion spring 27 is fixed between the bearing 26 and the washer 25 and acts to keep the flap 19 closed.

A movable separation wall 30 is positioned within the device and is moved horizontally. The movable separation wall unit consists of a left-hand plate 31 and a right-hand plate 32 between which is secured a gasket 33 of flexible material, which gasket is secured only along the edges of the plates. The separation wall 30 occupies the entire cross-section of the inside volume of the device and its gasket seals against its interior walls of the side walls 11, 14, 13, 15.

An elongated bushing (tube) 34 is fixed to the separation wall 30 and moves with it. The bushing 34 has fixed to it, at its right end, a nut 34a which is internally threaded and its threads are in mesh with the threads of the externally threaded elongated shaft 35. The shaft 35 is threaded on its left-hand half and unthreaded on its right-hand half. One end of the shaft 35 is fixed to the hub 36 of the wheel 37, the wheel 37 having thereon a handle 38. A smooth portion 39a near the end of the shaft 35 rotatably fits within a bearing 39, the bearing 39 being fixed to the side wall 12. The opposite end of the threaded shaft 35 rotates within a bearing 40 which is fixed to the support plate 41.

The support plate 41 also has secured to it one end of a second elongated bushing (tube) 51 which fits over the first bushing 34. The first bushing slidingly telescopes within the larger and outer second bushing 51. The first bushing 34 moves with the separation wall and the second bushing 51 is fixed. This arrangement permits the threaded portion of the shaft 34 to be covered by the bushings 34, 51 and prevents the pellets from entering the threads of the shaft 34. The rotation of the shaft 35 causes the nut 34a to move sidewise, carrying along the inner first bushing 34. As the bushing 34 is fixed to the separation wall, the separation wall is moved sidewise.

In an alternative embodiment (not shown) the separation wall slides for support on the horizontal fixed rods which prevent twisting motion arising from the turning of the handle 37 being imparted to the separation wall 32; that is, the separation wall 32 is prevented from twisting by the rods as well as by its position within the hopper.

As mentioned above, fixed sleeve 51 is provided around the left-hand side of the threaded shaft 35 and prevents plastic pellets from dropping on the left-hand threaded side of the shaft 35. The fixed sleeve 51 terminates at about the center of the hopper. Consequently, the separation wall 32 may not move past about the center of the hopper in its movement to the left as shown in FIG. 1. This limitation of movement of the separation wall is permissible as there will be at least 50%, at the minimum, of one material in the device. The ratio between the two resin granules is obtained by decreasing or increasing the size of both the left and right-hand volumes, on opposite sides of separation wall 32, by movement of the separation wall 32 away from the center and to the right along the horizontal line of arrow 60, except for a 50–50 ratio.

A sight glass 61 is provided in the side wall 11. The sight glass 61 consists of a glass or other transparent material over a horizontally elongated opening in the side wall 11 and covering that opening. The glass 61 is held in position by the elongated frame member 63. The glass 61 permits viewing of both the left and the right side of the separation wall 32. A scale, preferably along the bottom exterior edge of the frame 63, is provided to indicate to the operator the movement of the separation wall 32. The operator will line up the separation wall 32 with the scale provided on the bottom of the exterior lower edge of the frame 63.

Figure 2:
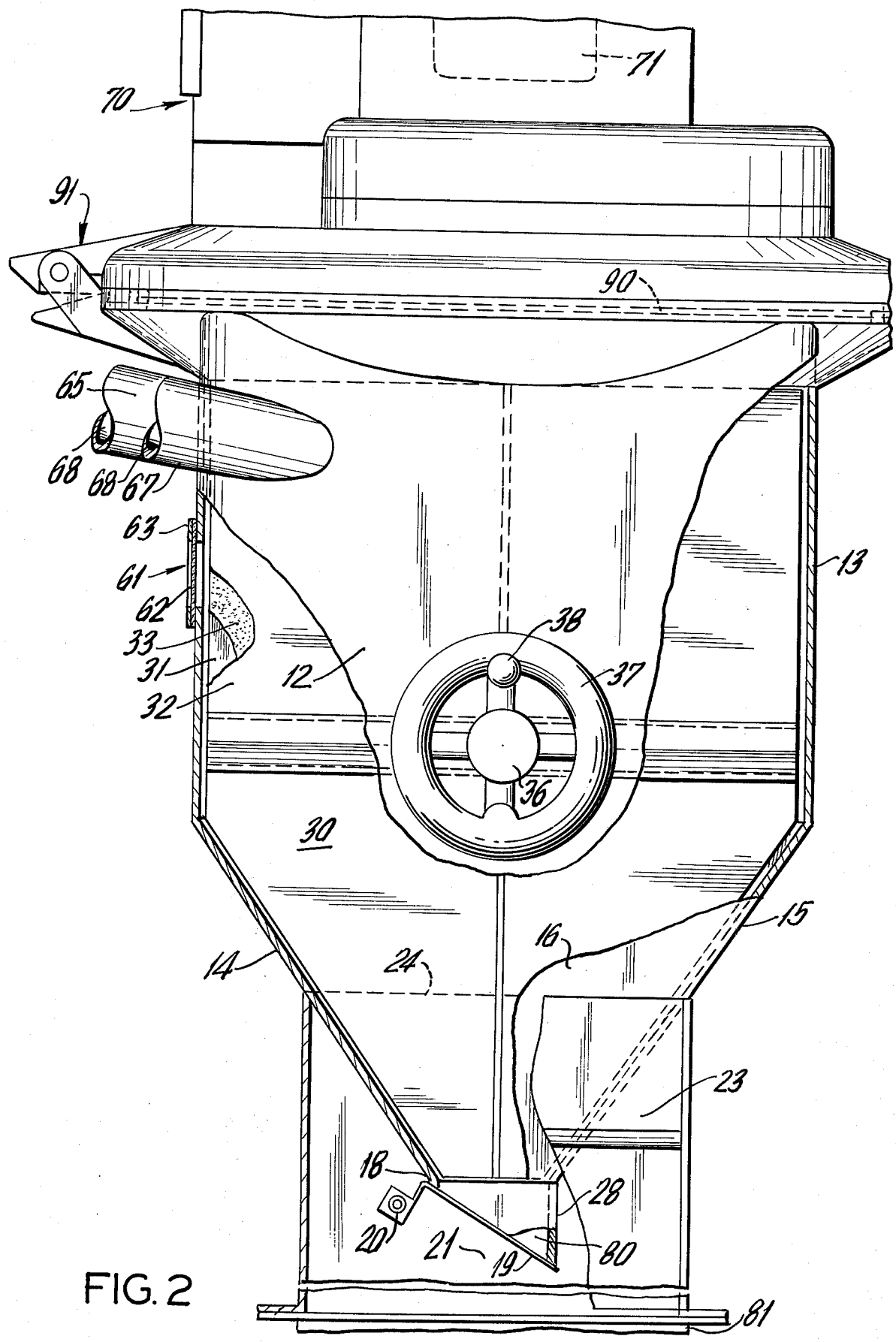
FIG. 2 is a side cross-sectional view of the ratio loader of the present invention.

A conduit (tube) 65, having an orifice 66 within the container, within side wall 11, leads to a reservoir, for example, a bin of virgin thermoplastic resin granules. A second conduit (tube) 67 having an orifice 68 in wall 12 leads to the reservoir (bin) of the other material, for example, the non-virgin thermoplastic resin granules. The conduit 67 is at the end of the side wall 12 and has a tangential entry so that materials may be sucked into the right side of the container when the separation wall 32 is close to the side wall 12. As shown in FIGS. 1 and 2 the two conduit orifices 66, 68 in the container are at the same level.

Figure 3:
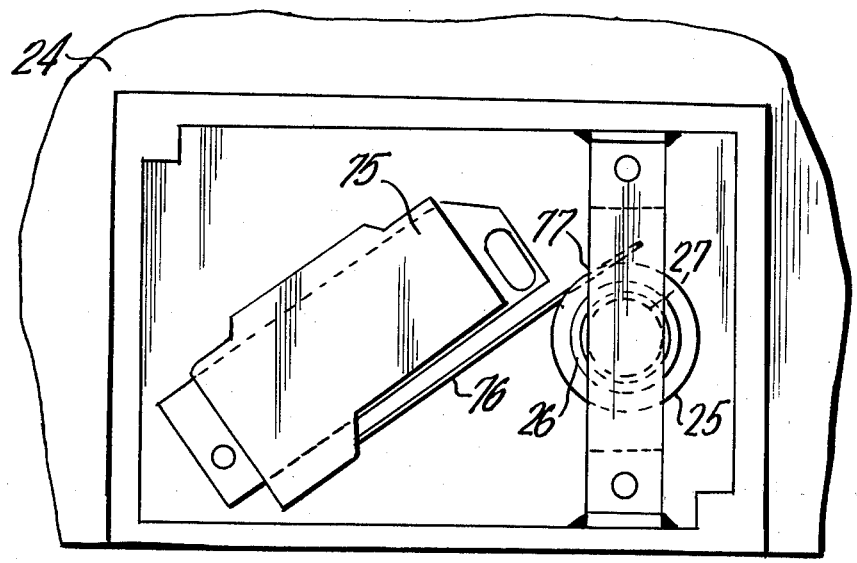
FIG. 3 is an enlarged drawing showing the location of micro-switch.

A suitable source of vacuum is provided to the ratio loader, which vacuum source (air pump) is controlled as to its timing. As shown in FIGS. 1 and 2, as an example of a controllable vacuum source, the vacuum source consists of a motor turbine unit 70 in which an electric motor drives a turbine, i.e., an impeller blade. A control box 71 is provided for the electrical control of the motor. As shown in FIG. 3, a microswitch 75 is mounted within the box 76 attached near the bottom of the bracket 24. The movable arm 76A of the microswitch 75 may be moved by a pin 77 attached to the washer 25. The rotation of the washer 25, because of the rotation of the shaft 20a due to movement of the flap 19, causes rotation of the pin 77, thereby operating the arm 76 of the microswitch 75.

When the flap 19 is opened, that is, when it moves in the clockwise direction of arm 21, opening the bottom orifice 80 of the container, the two types of thermoplastic resin granules within the container will fall out through the orifice 80 and into the hopper of the plastic extruder. The pivoting movement of the flap 19, through the rotation of pin 77, causes the movement of arm 76 of the microswitch 75, opening the motor circuit to the motor turbine unit 70 and preventing the vacuum from starting. Upon emptying of the container, after all of the thermoplastic resin granules have fallen out of the container and through the orifice 80, the flap 19 will be closed, i.e., rotated in a counterclockwise direction by means of the torsion spring 27. This movement of the shaft 20a will cause a rotation of the pin 77 moving the arm 76 of the microswitch 75. This closes the motor circuit to the motor turbine unit 70, starting the motor turbine 70 and causing a vacuum. Such vacuum, operating through the conduits 65 and 68, will draw thermoplastic resin granules from the respective reservoirs to which those conduits are connected. A timer (not shown), for example, within the electrical control box 71, will stop the rotation of the motor turbine unit after a predetermined time, thereby ending the vacuum so that additional resin would not be drawn from the two reservoirs. At that time the two volumes on opposite sides of the separation wall 32 would have been filled to the predetermined height at the level of the two orifices 66, 68 by the two types of plastic resin pellets. Under the weight of the granules the flap 19, which is elongated and extends over the entire length of the orifice 80 so that it is beneath both sides of the separation wall 32, will open and unload the two types of thermoplastic resin granules. After such unloading, the cycle will automatically recommence.

Figure 4:
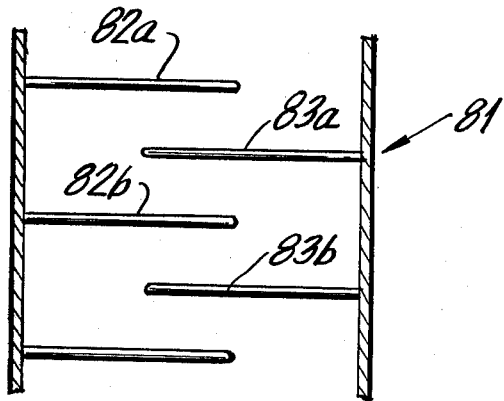
FIG. 4 is a cross-sectional view along the lines 4—4 of FIG. 1 looking in the directions of the arrows and showing a partial cross-section of the mixer device.

A mixer 81 may be provided beneath the flap 19. The mixer may be of various types and may be, for example, interleaved metal fingers or a motor unit such as motor driven screens or fingers, which motor is driven only when the flap 19 is opened. As shown in FIG. 4, the mixer 81 consists of interleaved metal fingers which extend from opposite sides, the fingers 82a and 82b, etc., extending from the left side and being interleaved, although separated from the fingers 83a and 83b, etc., extending from the right side. The fingers are fixed and provide mixing of the two types of resin pellets as they fall from the orifice 80. The fingers are provided sufficiently below the level of the movement of the bottom free edge of the flap 19 so as not to interfere with the opening of the flap.

A filter 90 is provided between the container and the motor turbine unit 70. The filter is arranged so that it prevents the pellets from being pulled up into the motor turbine unit. The filter is replaceable by lifting the motor turbine unit in a counterclockwise direction as shown in FIG. 2, the entire motor turbine unit 70 being hinged on the hinge 91.

What is claimed is:

1. A ratio unit loader having means to connect said loader to the hopper of a thermoplastic resin processing machine, a set of connected side walls forming an enclosed container, a bottom orifice in said container, a movable flap having opened and closed positions and covering said orifice in its closed position and opening to uncover said orifice in its open position, uniform mixture means to form separate piles from two different reservoirs of thermoplastic resin to the same predetermined level within said container and to flow the said two resins after the said flap is opened in a uniform simultaneous flow from said two piles within said container to provide a uniform mixture to said processing machine, said uniform mixture means including, a single substantially vertically oriented separation wall within said container which separates the two said piles of thermoplastic resin and forms two volumes within said container, a first and a second conduit each having a fixed opening into only one of said volumes and each being connectable to different reservoirs of said two reservoirs of thermoplastic resin, movement means to move said separation wall sidewise to select the ratio of the said two resins in said mixture and to determine the size of the outlets through which the said resins will discharge, said movement means including a handle outside of said container to move said separation wall sidewise to form a proportionally smaller outlet to discharge the lesser amount of the two said resins and at the same time to form a larger outlet to simultaneously discharge the greater amount of the two said resins, means to apply vacuum to within the two said container volumes and bring the said two resins on opposite sides of said separation wall to substantially said same predetermined level before said flap is opened, a timer means to control the timing of said vacuum means to continue said vacuum until said predetermined substantially equal level is obtained and thereafter to stop said vacuum means, whereby after the flap is opened the two resins commence and finish flowing substantially at the same time to provide a uniform mixture to said processing machine, and control means to start said vacuum means in timed relationship to the closing of said flap so that upon said flap closing the vacuum means is thereafter started.

2. A ratio unit loader as in claim 1 wherein said movement means is an elongated horizontally directed rotatable shaft rotatably mounted on said container and said separation wall has an affixed member having internal screw threads meshing with said threaded shaft.

3. A ratio unit loader as in claim 1 wherein said bottom orifice is an elongated slot extending to below both of said volumes.

4. A ratio loader as in claim 1 and further comprising mixer means having opposed and interleaved fingers positioned beneath said flap and above said machine hopper.

5. A ratio loader as in claim 1 wherein said separation wall has along its outer edge a seal which slides on the inner walls of the container.

6. A ratio loader as in claim 1 wherein the means to apply vacuum is a motor turbine set having an impeller, said motor turbine being mounted above said container.

7. A ratio loader as in claim 1 wherein said flap is mounted on a shaft and said control means includes a switch operated by movement of said flap shaft.

8. A ratio unit loader as in claim 1 wherein said uniform mixture means includes the said two fixed openings of the said first and second conduits at the same level.

* * * * *